3,063,924
PROCESS FOR REMOVING MINERAL CONSTITU-
ENTS FROM AN AQUEOUS LIQUID
Cyril Gomella, Alger, Algeria, assignor to Societe
d'Etudes pour le Traitement et l'Utilisation des Eaux-
S.E.T.U.D.E.
Filed Oct. 10, 1958, Ser. No. 766,501
Claims priority, application France Oct. 11, 1957
2 Claims. (Cl. 204—180)

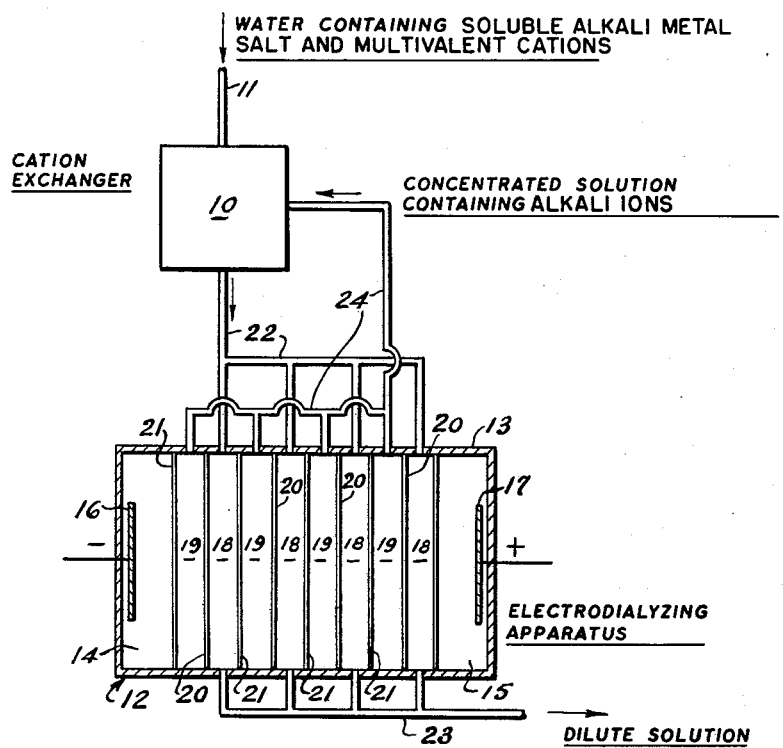

Theoretically it is possible to remove ions of every type and sign from an aqueous solution by means of electrodialysis. In practice, however, only the removal of univalent ions and multivalent anions is easily accomplished, but the presence of multivalent cations such as those of calcium and magnesium causes difficulties e.g. due to the formation of deposits on the membranes. It is possible to remove those multivalent cations by means of ion-exchangers, but in those regions where there is a deficiency of usable water and where, consequently, electrodialysis is a most desirable process, regeneration of the spent ion-exchanger presents much trouble.

The idea of the present invention is to use for regeneration of the ion exchanger the concentrated salt solution which comes from the concentrating cells of a multi-cell electrodialyzing apparatus having a plurality of concentrating and diluting cells between its electrodes. In these cells the ions are accumulated which are removed from the dialyzing or diluting cells.

Consequently the process for demineralizing an aqueous liquid which contains, in addition to at least one soluble alkali metal salt, for example, sodium chloride, at least one soluble salt of a multivalent cation, such as that of calcium and/or magnesium and which may also contain other cations and anions consists, according to the invention, of two steps:

the first step is to remove wholly or partly at least one of the multivalent cations (e.g. that of calcium by means of a cation-exchanger, whereupon the liquid is passed from the cation-exchanger through the electrodialyzing apparatus to remove at least part of at least one monovalent ion and to form a concentrated salt solution in the concentrating cells of such apparatus;

the second step is to regenerate the spent cation-exchanger with the concentrated salt solution from the concentrating cells of the electrodialyzing apparatus which concentrate is enriched with alkali metal ions.

The process embodying the invention will be further described with reference to the accompanying drawing having a single diagrammatic view of apparatus with which the process may be conveniently practiced.

Referring to the drawing in detail, it will be seen that the aqueous liquid to be demineralized is supplied to a cation exchanger 10 by way of a conduit 11 so as to effect removal of multivalent ions, such as, calcium ions, from the initial liquid. The liquid thus treated is then subjected to electrodialysis in a conventional multicell electrodialyzing apparatus 12 of the type comprising a tank 13 having chambers 14 and 15 at its opposite ends containing a cathode 16 and an anode 17, respectively, while the remainder of the tank therebetween is divided into alternately arranged diluting cells 18 and concentrating cells 19 by means of anion-permeable membranes 20 and cation-permeable membranes 21. The liquid treated in cation-exchanger 10 is supplied to the diluting cells 18 by way of a conduit system 22 so that, when an electric current is passed through the apparatus, cations pass from cells 18 through the membranes 21 toward the cathode 16 into the concentrating cells 19, while anions pass from cells 18 through membranes 20 toward the anode 17 also into the concentrating cells 19. Thus, the ions are depleted in diluting cells 18 and the aqueous liquid withdrawn from such cells by way of a conduit system 23 is demineralized or desalted so as to be made potable. At the same time, the concentrating cells 19 take up ions so that a concentrated salt solution is produced therein, and this concentrated salt solution is withdrawn from cells 19 by way of a conduit system 24 and passed through cation-exchanger 10 for regenerating the latter in accordance with this invention. During electrodialysis, not only calcium or magnesium ions (hardness-causing ions) which may cause difficulties, but also, under certain conditions, other ions, such as those of cadmium or iron, may prove troublesome. Also silicium dioxide sometimes hinders electrodialysis. Consequently in those cases it will be desirable to employ an ion-exchanger or a combination of ion-exchangers capable of removing, either partly or wholly, such cations and even anions that may cause difficulties. In doing so, the exchanger will at least give off alkali ions and, where a combination exchanger is used, also anions. The exchanger or combination of exchangers may be regenerated by the concentration liquid which is enriched with alkali ions and with certain anions such as e.g. chlorine ions.

It will depend on the type of electrodialyzing apparatus and on the tolerable salt concentration in the liquid product withdrawn through conduit system 23 how much concentrated salt solution is available for regenerating purposes. If the system is to be worked for a considerable period of time it may be necessary either to be content with a smaller volume of demineralized or desalted liquid product than normal or to accept a higher salt concentration in such liquid product.

Of course it is possible to aid the regeneration of the spent ion-exchanger by also using a regenerating liquid which does not originate in the electrodialysis apparatus.

But in certain regions, especially in arid regions, this may become difficult if insufficient usable water is available to begin with. In these cases the regeneration can be assisted by the following principle more fully described in the copending patent application by the same applicant which is identified as Serial No. 762,141.

If part of the initial liquid (containing one or more soluble alkali metal salts and one or more soluble salts of multivalent cations) is subjected to evaporation (either artificial or natural, e.g. by sun-heat), the multivalent cations tend to precipitate as insoluble salts (such as calcium carbonate formed from bicarbonate ions which are transformed into carbonate ions during the evaporation step; magnesium carbonate; calcium sulphate) whereas the alkali metal salts tend to remain in solution. In the liquid which is concentrated by evaporation, the ratio between alkali ions and multivalent cations (e.g. the ratio Na:Ca) is greater than before evaporation with the result that the concentrated liquid is suitable for regenerating the spent cation-exchanger.

The liquid which is subjected to evaporation need not be identical with the liquid which is electrodialyzed after being passed through the cation-exchanger, but it should be of the same type with respect to the presence of both soluble alkali salts and soluble salts of multivalent cations.

*Example*

The electrodialysis apparatus was a multicell apparatus in which the dialyzing liquid was in turbulence according to French Patent 1,021,304. Between each two membranes spacers were present according to French Patent 1,073,704. The membranes were of a heterogeneous type (ion-exchanger with a binding agent). The apparatus was of the type as described in Franch Patent 1,083,942 with four holes in each membrane and consequently separated flow of dialysate and rinsing liquids. The current density was 12 to 15 milliamperes per square centimeter.

The composition of the initial liquid was (milliequivalents per litre):

| Na | Ca | Mg | SO₄ | Cl, etc. |
|---|---|---|---|---|
| 205.3 | 36.4 | 66.7 | 52.1 | 256.3 |

100 litres of this liquid were dehardened in a cation-exchanging unit (IMAC C12). The composition of the dehardened liquid was (in millequivalents per litres):

| Na | Ca+Mg | SO₄ | Cl, etc. |
|---|---|---|---|
| 307.4 | 1.0 | 52.1 | 256.3 |

This liquid was electrodialyzed; 75 litres were sent through the dialyzing cells and 5 litres through the rinsing cells. From the dialyzing cells 73.6 litres liquid were obtained with the composition (milliequivalents per litre):

| Na | Ca+Mg | SO₄ | Cl, etc. |
|---|---|---|---|
| 20.6 | 0.1 | 7.2 | 13.7 |

From the rinsing cells 26.4 litres of concentrate were obtained with the composition (milliequivalent per litre):

| Na | Ca+Mg | SO₄ | Cl, etc. |
|---|---|---|---|
| 1,107 | 3.5 | 177 | 933 |

This liquid was used for regenerating the ion-exchanger. The requirements to be fulfilled by the regenerating liquid are:

(1) at least 1 gram ion sodium ion per litre must be present; this requirement was fulfilled because there were 1.1 gram ions sodium per litre present;
(2) total amount of sodium must be at least 2.5 times the amount of Ca+Mg bound in the ion-exchanger; since 100 litres of the initial water give off 100×0.1021 =10.21 gram equivalents Ca+Mg the regenerating liquid must contain at least 2.5×10.21=25.53 gram equivalents sodium; this requirement is also fulfilled because the concentrate contained 26.4×1.107=29.22 gram equivalents sodium. After some hundreds of hours running the electrodialyzing process still proceeded without difficulties.

If on the contrary, with the same initial water, an electrodialysis process without use of an ion-exchanger was carried out in the same apparatus under the same conditions, then in the beginning no difficulties arose; a dialysate was obtained having the composition (milliequivalents per litre):

| Na | Ca | Mg | SO₄ | Cl, etc. |
|---|---|---|---|---|
| 23.4 | 3.3 | 7.4 | 7.6 | 16.4 | and a concentrate with (milliequivalents per litre):

| Na | Ca | Mg | SO₄ | Cl, etc. |
|---|---|---|---|---|
| 387.2 | 69.5 | 126.0 | 96.6 | 496.2 |

After a few hours' running, however, the process had to be stopped because the electric terminal tension became too high as a result of calcareous deposits on the membranes causing an intolerable increase in ohmic resistance.

If the sulphate content of the initial water is very high, there is a possibility of formation of a calcium sulphate precipitate on the ion-exchanger during either the dehardening or the regenerating step. This may be obviated by using a continuous dehardening filter in which the entering liquid is always in contact with regenerated exchanger so that practically no calcium ions are set free.

It will be understood that the invention is not restricted to any specific type of electrodialysis nor of ion-exchanger.

What I claim is:

1. In a process for removing from an aqueous liquid at least part of at least one multivalent cation and at least part of at least one monovalent cation; the steps of first passing the aqueous liquid through a cation-exchanging unit so as to remove at least part of at least said one multivalent cation from the aqueous liquid, subsequently passing the liquid from said cation-exchanging unit through a multicell electrodialyzing unit having a plurality of concentrating and diluting cells between its electrodes so as to remove cations and anions and to form a concentrated salt solution in said concentrating cells, and at least partially regenerating said cation-exchanging unit by means of said concentrated salt solution drawn from said concentrating cells and which is rich in alkali ions.

2. In a process as in claim 1; the further steps of evaporating an aqueous liquid containing at least one soluble alkali metal salt and at least one soluble salt of a multivalent cation so that, after the evaporation, the ratio of monovalent cation from said alkali metal salt to multivalent cation in the liquid is greater than before said evaporation, and additionally regenerating said cation-exchanging unit by means of said liquid obtained from the evaporation.

References Cited in the file of this patent

UNITED STATES PATENTS

| 2,688,572 | Warshaw | Sept. 7, 1954 |
| 2,793,183 | Thurman | May 21, 1957 |
| 2,794,777 | Pearson | June 4, 1957 |
| 2,835,632 | Kollsman | May 20, 1958 |
| 2,838,449 | Briggs | June 10, 1958 |

FOREIGN PATENTS

| 751,855 | Great Britain | July 4, 1956 |

OTHER REFERENCES

Industrial and Engineering Chemistry, vol. 45, No. 11, Nov. 1953, pages 2394–2401.